(12) United States Patent
Kasar

(10) Patent No.: US 12,292,576 B2
(45) Date of Patent: May 6, 2025

(54) SYSTEMS WITH WIRELESS INTERFACE FOR REMOVABLE SUPPORT ACCESSORIES

(71) Applicant: Apple Inc., Cupertino, CA (US)

(72) Inventor: Darshan R. Kasar, Redwood City, CA (US)

(*) Notice: Subject to any disclaimer, the term of this patent is extended or adjusted under 35 U.S.C. 154(b) by 0 days.

(21) Appl. No.: 18/176,673

(22) Filed: Mar. 1, 2023

(65) Prior Publication Data

US 2023/0324701 A1 Oct. 12, 2023

Related U.S. Application Data

(63) Continuation of application No. PCT/US2021/050068, filed on Sep. 13, 2021.

(60) Provisional application No. 63/078,136, filed on Sep. 14, 2020.

(51) Int. Cl.
*G09G 5/00* (2006.01)
*G02B 27/01* (2006.01)

(52) U.S. Cl.
CPC .. *G02B 27/0176* (2013.01); *G02B 2027/0156* (2013.01)

(58) Field of Classification Search
CPC .................. G02B 27/0176; G02B 2027/0156
USPC ............................................................ 345/8
See application file for complete search history.

(56) References Cited

U.S. PATENT DOCUMENTS

| | | | |
|---|---|---|---|
| 8,596,881 B2 | 12/2013 | Umeno | |
| 8,946,941 B2 | 2/2015 | Maughan et al. | |
| 9,875,406 B2 | 1/2018 | Haddick et al. | |
| 10,571,691 B1 | 2/2020 | Yee et al. | |
| 10,663,737 B1* | 5/2020 | Magrath | G02B 27/0176 |
| 2010/0102915 A1 | 4/2010 | Rhodes et al. | |
| 2010/0104031 A1 | 4/2010 | Lacour | |
| 2015/0016035 A1 | 1/2015 | Tussy | |
| 2015/0253574 A1 | 9/2015 | Thurber | |
| 2016/0261300 A1 | 9/2016 | Fei et al. | |
| 2016/0334644 A1* | 11/2016 | Garofolo | G02B 27/017 |
| 2016/0357250 A1 | 12/2016 | Kim et al. | |
| 2019/0165457 A1* | 5/2019 | Tsai | A63F 13/212 |

(Continued)

FOREIGN PATENT DOCUMENTS

| | | |
|---|---|---|
| CN | 110460129 A | 11/2019 |
| WO | 2019142807 A1 | 7/2019 |
| WO | 2020014707 A1 | 1/2020 |

*Primary Examiner* — Jennifer T Nguyen
(74) *Attorney, Agent, or Firm* — Treyz Law Group, P.C.; G. Victor Treyz; Jinie M. Guihan

(57) ABSTRACT

A head-mounted device may have a head-mounted housing. The head-mounted housing may have displays that display images for a user. The images are viewable from eye boxes while the head-mounted device is being worn by the user. A head strap may be removably coupled to the head-mounted housing to help hold the displays in position during operation of the head-mounted device. The head strap and head-mounted housing may have wireless power circuitry and communications circuitry. The wireless power circuitry may be used to transmit power from a battery in the head strap to the head-mounted housing. The communications circuitry may include wireless radio-frequency circuitry and/or optical circuitry that allow the head strap to convey wireless data to the head-mounted housing. The head-mounted housing may also transmit power and/or data to the strap.

30 Claims, 6 Drawing Sheets

(56) References Cited

U.S. PATENT DOCUMENTS

| | | | |
|---|---|---|---|
| 2019/0310713 A1* | 10/2019 | Wang | G06F 3/016 |
| 2020/0343775 A1 | 10/2020 | Yahagi et al. | |
| 2021/0026148 A1* | 1/2021 | Yoon | G02B 27/0093 |
| 2021/0211640 A1* | 7/2021 | Bristol | G02B 27/0176 |
| 2021/0307445 A1* | 10/2021 | Leegate | H05B 47/185 |

* cited by examiner

SYSTEMS WITH WIRELESS INTERFACE FOR REMOVABLE SUPPORT ACCESSORIES

This application is a continuation of international patent application No. PCT/US2021/050068, filed Sep. 13, 2021, which claims priority to U.S. provisional patent application No. 63/078,136, filed Sep. 14, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be positioned in desired locations relative to a user's head using head-mounted support structures.

SUMMARY

A head-mounted device may have a head-mounted housing. The head-mounted housing may have displays that display images for a user. The images are viewable from eye boxes while the head-mounted device is being worn by the user.

The head-mounted device may have removable portions such as removable head straps, light seals, lenses, and/or other accessories that may potentially benefit from hermetically sealed interfaces. As an example, a head strap may be removably coupled to the head-mounted housing to help hold the displays in position during operation of the head-mounted device. The head strap may contain a battery for powering the head-mounted device and optional sensors and other components. Because removable structures such removably coupled head straps, removably coupled light seals, removably coupled vision correction lenses, and other removable structures may contain sensors, batteries, and other electrical components, structures such as these may sometimes be referred to as accessories, head-mounted device accessories, removable head-mounted device accessories, or removable accessories. Accessory enclosure structures may have walls that form a hermetic seal for the accessory.

The head strap or other accessory and the head-mounted housing may have wireless power circuitry and communications circuitry. During operation, the wireless power circuitry may be used to transmit power from the head strap or other accessory to the head-mounted housing.

The communications circuitry may include wireless radio-frequency circuitry and/or optical circuitry that allow the head strap or other accessory to convey wireless data to corresponding communications circuitry in the head-mounted housing. In some configurations, the head-mounted housing may transmit power and/or data to the strap or other removably coupled accessory.

DETAILED DESCRIPTION

Head-mounted devices may have displays for displaying content for a user. To hold the displays and other portions of a head-mounted device in a desired position on the head of a user, the head-mounted device may have head-mounted support structures. The head-mounted support structures may include a head-mounted housing that is configured to rest against the face of a user and additional support structures such as a head strap. The head strap may be removable. This allows different head straps to be selectively switched into use. For example, different users may prefer to use different head straps. In some arrangements, different head straps may be provided with different components, allowing a user may select an appropriate head strap for use in a particular operating environment.

Figure 1:
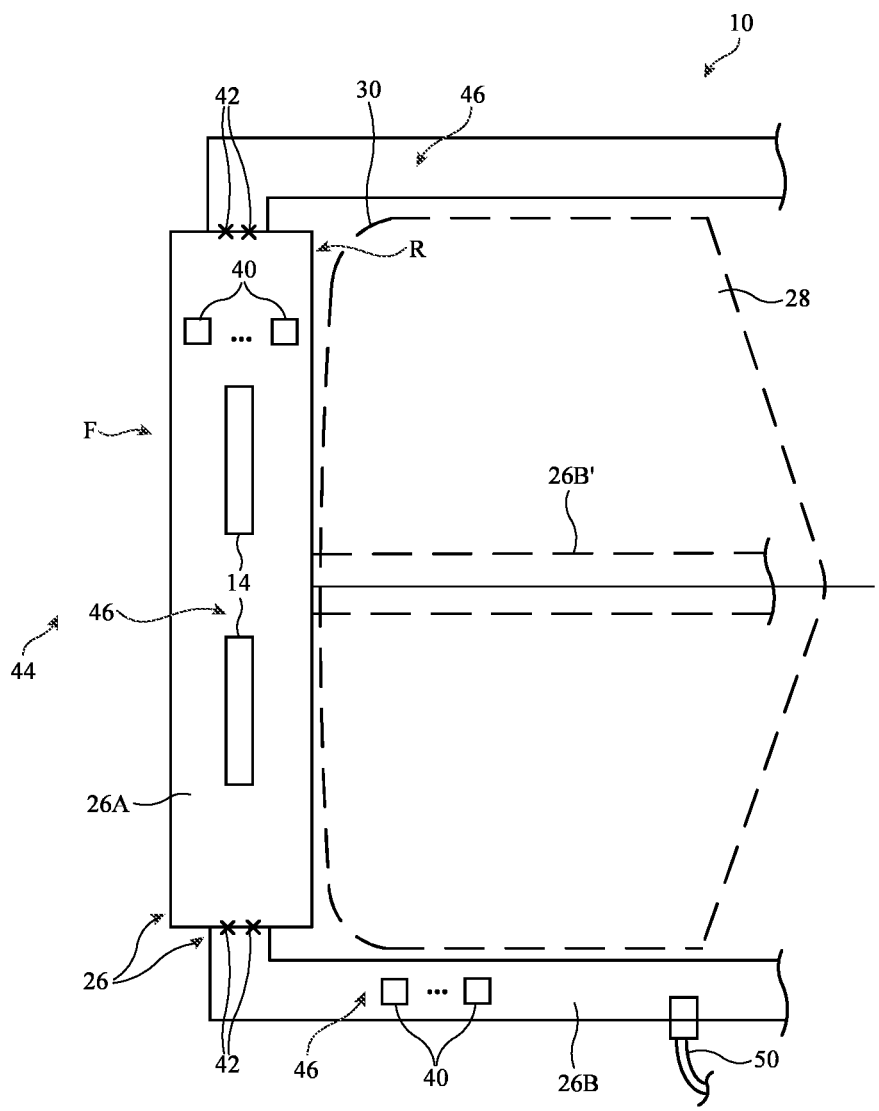
FIG. 1 is a top view of an illustrative electronic device such as a head-mounted device in accordance with an embodiment.

FIG. 1 is a top view of an illustrative head-mounted electronic device with a removable head strap. As shown in FIG. 1, head-mounted device 10 may include head-mounted support structures such as head-mounted support structure 26. Support structure 26 may have a first portion forming head-mounted device housing 26A and a second portion forming head strap 26B. Head-mounted housing 26A, which may sometimes be referred to as forming a head-mounted device main unit, a head-mounted device main unit housing, head-mounted device housing walls, main unit housing walls, head-mounted device main unit support structures, etc., may be removably coupled to head strap 26B using connectors 42. Head strap 26B may have one or more elongated members that extend around the user's head 28 and/or that are otherwise configured to be worn head 28 while helping to support housing 26A on head 28.

In addition to portions that extend around the back of the user's head, strap 26B may, if desired, include portions that pass over the top of the user's head such as illustrative strap portion 26B'. Device 10 may also involve removable support structures that are configured to support device 10 in an off-the-head usage mode (e.g., on a table top) and/or may include removable head-mounted support structures such as helmet structures, hat structures, etc. Configurations in which the removable support structures that are coupled to housing 26A with connectors 42 are removable head-mounted support structures such as head strap 26B and in which head strap 26B is formed from a single loop of material that extends along the sides of head 28 and around the rear of head 28 may sometimes be described herein as an example. This is illustrative. Any suitable removable support structures may be coupled to housing 26A using connectors 42.

Connectors 42 may include press-fit connections, interlocking engagement structures (e.g., protrusions such as plugs and mating recesses such as sockets), screws and other fasteners, clips, snaps, magnets, hook and loop fasteners, spring-loaded structures, and/or other connector structures. Using connectors 42, a user may attach strap 26B to housing 26A so that device 10 can be worn on the user's head and may detach strap 26B from housing 26A. A user may, as an example, detach strap 26B from housing 26A when it is desired to swap a different strap into use, when it is desired to mount housing 26A on a non-strap support structure, or when it is desired to use device 10 without any support structures attached to housing 26A by connectors 42.

Housing 26A and strap 26B may be formed from layers of material forming support structure walls and/or internal support structures (e.g., internal frame structures). The materials that are used in forming housing 26A and strap 26B may include polymer, glass, metal, ceramic, crystalline material such as sapphire, fabric, wood, leather, and other natural materials, other materials, and combinations of these materials. In an illustrative configuration, some of front face F of housing 26A may be covered in glass or other transparent material overlapping a display, some of the sidewalls and/or rear portions of housing 26A may be formed with layers of polymer and/or layers of fabric and strap 26B may have surfaces covered with polymer layers and/or fabric (as examples). Other materials may be used in forming support structures 26, if desired.

The walls and/or other structures forming the external surfaces of support structure 26 may separate interior device regions 46 in housing 26A and strap 26B from an exterior region surrounding device 10 such as exterior region 44. Electrical components 40 (e.g., integrated circuits, sensors, control circuitry, input-output devices, communications circuits, antennas, optical components, etc.) may be mounted on printed circuits and/or other structures within device 10 (e.g., in interior region 46). Electrical components 40 may be used to help convey power and/or data between housing 26A and strap 26B. For example, in a configuration in which a battery is located in interior region 46 of strap 26B or in which strap 26B receives external power from a wall outlet or external battery pack using a cable such as optional removable cable 50, power can be conveyed from strap 26B to housing 26A. As another example, strap 26B may receive data from components 40 and/or may receive data from external equipment that is tethered to strap 26B using optional cable 50 or that communicates wirelessly with strap 26B. This data may be conveyed to housing 26A from strap 26B. Wired connections, wireless connections, and/or optical connections may be used to transmit power and/or data from strap 26B to housing 26A and/or vice versa.

To present a user with images for viewing from eye boxes such as eye box 34, device 10 may include displays such as display 14 and lenses aligned with displays 14. These components may be mounted in optical modules in housing 26A. There may be, for example, a left display for presenting an image through a left lens to a user's left eye in a left eye box and a right display for presenting an image to a user's right eye in a right eye box. The user's eyes are located in eye boxes 34 when head-mounted housing 26A rests against the outer surface (face surface 30) of the user's face. Housing 26A may have a nose bridge portion configured to fit over a user's nose, may have a soft rear surface (on rear face R) to provide comfort as the rear portion of housing 26A presses against face surface 30, and/or may have other structures that are configured to receive the user's face.

Figure 2:
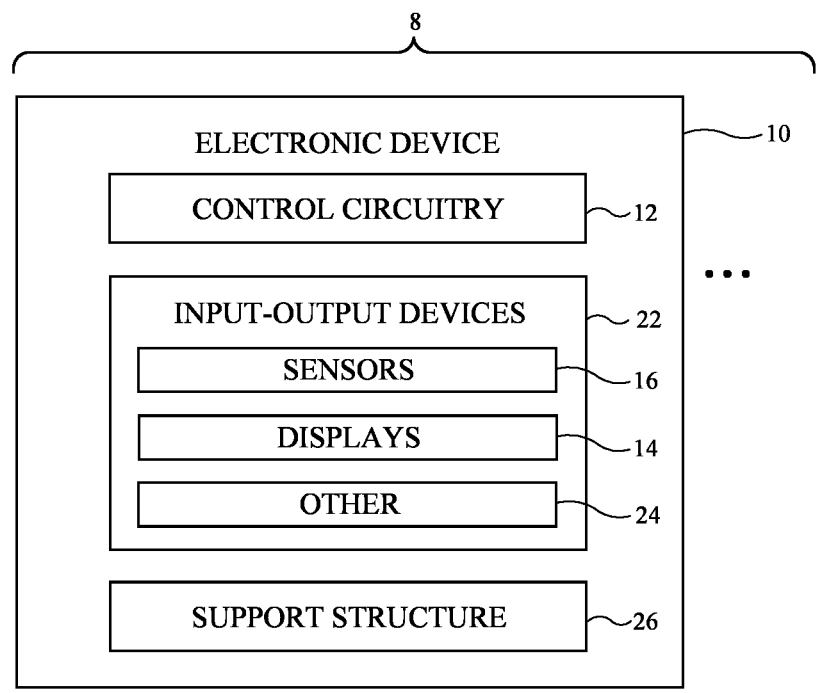
FIG. 2 is schematic diagram of an illustrative system with an electronic device in accordance with an embodiment.

A schematic diagram of an illustrative system that may include a head-mounted device is shown in FIG. 2. As shown in FIG. 2, system 8 may have one or more electronic devices 10. Devices 10 may include a head-mounted device such as device 10 of FIG. 1, accessories such as headphones, associated computing equipment (e.g., a cellular telephone, tablet computer, laptop computer, desktop computer, and/or remote computing equipment that supplies content to a head-mounted device), external battery packs, external processing units, and/or other devices that communicate with head-mounted devices.

Each electronic device 10 may have control circuitry 12. For example, head-mounted device 10 of FIG. 1 may have control circuitry 12 that is located in interior region 46 of housing 26A and may have control circuitry 12 that is located in interior region 46 of strap 26B.

Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10) may be used to support communication between electronic devices and/or between different portions of a given electronic device. For example, in device 10 of FIG. 1, communications circuitry in strap 26B may communicate with communications circuitry in housing 26A.

Any suitable information may be conveyed between devices 10 and/or between portions of a given device. For example, one electronic device or portion of a given device may transmit video data, audio data, and/or other data to another electronic device in system 8 or to another portion of the given device. Communications may be supported using wired and/or wireless communications circuitry (e.g., radio-frequency wireless communications circuitry and/or optical communications circuitry). Communications traffic may pass through one or more communications networks (e.g., the internet, local area networks, etc.) and/or may be conveyed between devices 10 or portions of devices 10 directly. In some configurations, the communications circuitry of system 8 may be used to allow data to be received by a given one of devices 10 from external equipment (e.g., a tethered computer, a portable device such as a handheld device or laptop computer, online computing equipment such as a remote server or other remote computing equipment, or other electrical equipment) and/or to provide data to external equipment.

Each device 10 in system 8 may include input-output devices 22. For example, head-mounted device 10 of FIG. 1 may have input-output devices 22 in housing 26A and may have input-output devices 22 in strap 26B. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more displays such as displays 14. In some configurations, device 10 includes left and right display devices. Device 10 of FIG. 1 (e.g., housing 26A) may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. For example, sensors 16 may be mounted in housing 26A and/or sensors 16 may be mounted in strap 26B of device 10 of FIG. 1. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

When located in housing 26A, sensors 16 may, as an example, face forward (outwardly from front face F), and/or to the side or rearwardly. Strap 26B extends along the sides and rear of head 28, which allows sensors 16 in strap 26B to face outwardly to the sides and/or rear of device 10 (e.g., to gather images and other sensor data from behind the user and/or to the side of the user in addition to potentially gathering data from in front of the user).

During operation, user input and other information may be gathered using sensors and other input devices in input-output devices 22. If desired, input-output devices 22 in devices 10 (e.g., in housing 26A of FIG. 1 and/or strap 26B of FIG. 1) may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Figure 3:
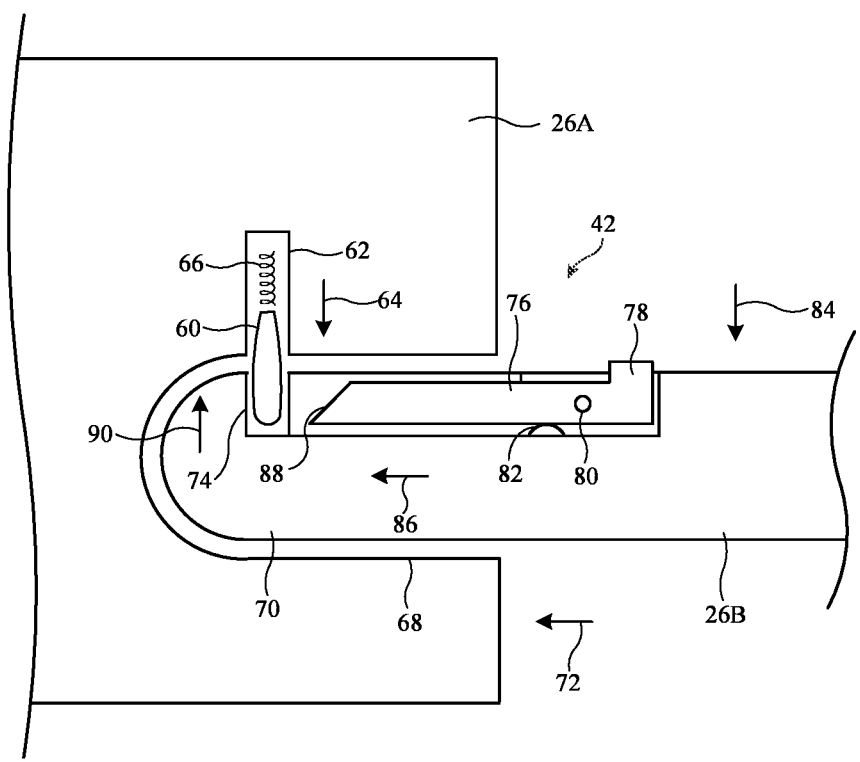
FIG. 3 is a cross-sectional side view of a portion of an illustrative electronic device with a removable support structure in accordance with an embodiment.

FIG. 3 is a cross-sectional side view of an illustrative removable connector arrangement for removably attaching strap 26B to housing 26A. In the example of FIG. 3, connector 42 is a latching structure with a spring loaded pin such as spring loaded pin 60. Pin 60 may be mounted in recess 62 of housing 26A and may be biased in direction 64 by spring 66. In the example of FIG. 3, housing 26A includes a recess such as recess 68 that is configured to receive mating end portion 70 of strap 26B. Portion 70 has a pin recess (e.g., an elongated hole or other structure) such as pin recess 74 that is configured to receive the tip of pin 60. To attach strap 26B to housing 26A, a user may press portion 70 into strap recess 68 in direction 72. Initially, the tip of pin 60 is compressed into recess 62 by the surface of portion 70. When portion 70 of strap 26B is fully inserted into strap recess 68, pin recess 74 becomes aligned with pin 60. When pin 60 becomes aligned with pin recess 74 in this way, spring 66 pushes pin 60 into recess 74, thereby securing strap 26B to housing 26A.

When it is desired to remove strap 26B from housing 26A, a user may press button portion 78 of release member 76 in direction 84. Member 76 may have a pin such as pin 80 that rides in a vertical slot in the body of strap 26B. This may help prevent inadvertent lateral movement of member 76. When portion 78 is pressed in direction 84, member 76 compresses spring 82 and pin 80 slides downwards in the slot in strap 26B until pin 80 disengages from the slot. Once disengaged, the user may slide member 76 in direction 72 so that cam surface 88 of member 76 can press pin 60 upwards in direction 90. By forcing pin 60 out of pin recess 74, strap 26B is released from housing 26A and can be removed. A lateral spring in strap 26B may be used to retract member 76 following use to release strap 26B. Other removable attachment mechanisms may be used to secure strap 26B to housing 26A if desired. The configuration of FIG. 3 is illustrative.

Strap 26B may contain components that receive and/or gather data. For example, components such as front-facing, side-facing, and/or rear-facing cameras and other sensors 16 may be used to gather data from the environment surrounding device 10 and/or communications circuitry in strap 26B may receive wired and/or wireless data from external devices. Housing 26A may likewise use wired and/or wireless communications circuitry and sensors 16 to gather data. Strap 26B may contain a battery and/or may receive power from an external source using a cable such as cable 50 (FIG.

1) or via a wireless power link. In some configurations, housing 26A may have a battery and/or may receive power via wired or wireless path(s).

When strap 26B is coupled to housing 26A, it may be desirable to transmit data from strap 26B to housing 26A and/or it may be desirable to transmit data from housing 26A to strap 26B. It may also be desirable to convey power from strap 26B to housing 26A and/or to convey power from housing 26A to strap 26B. In an illustrative configuration, components in strap 26B gather data that is transmitted to housing 26A and a battery in strap 26B provides power to housing 26A. Housing 26A may use received data in operating device 10 (e.g., received data may be used to present content to a user with displays 14 and/or other output devices). The components of housing 26A may be powered using power received from strap 26B. With this type of configuration, a battery for device 10 may be mounted to the side or rear of the user's head, helping to balance the weight of housing 26A. Sensor data gathered using sensors in strap 26B may be provided to processing circuitry in housing 26A and/or other data may be provided to the circuitry of housing 26A. Output data (e.g., signals for controlling speakers, haptic output devices, and/or other output devices in strap 26B) may be provided from housing 26A to strap 26B.

In general, any suitable type of communications path may be used to transmit data between the circuitry of strap 26B and housing 26A (e.g., wired, wireless, optical, radio-frequency, etc.). Any suitable type of power transfer path may be used to convey power between the circuitry of strap 26B and housing 26A (e.g., wired power transfer, wireless power transfer, etc.). In some embodiments, wireless data and power transfer techniques are used, which may facilitate the use of housing and strap walls (or the walls of other accessories such as light seal walls, lens housing walls in a removable lens, etc.), to form seals against contaminants (e.g., to prevent moisture ingress in the vicinity of the coupling structure used to removably attach strap 26B to housing 26A). Accessories with sealed walls (e.g., walls without vulnerable electrical ports or other openings that are sensitive to moisture ingress) may exhibit enhanced durability.

Figure 4:
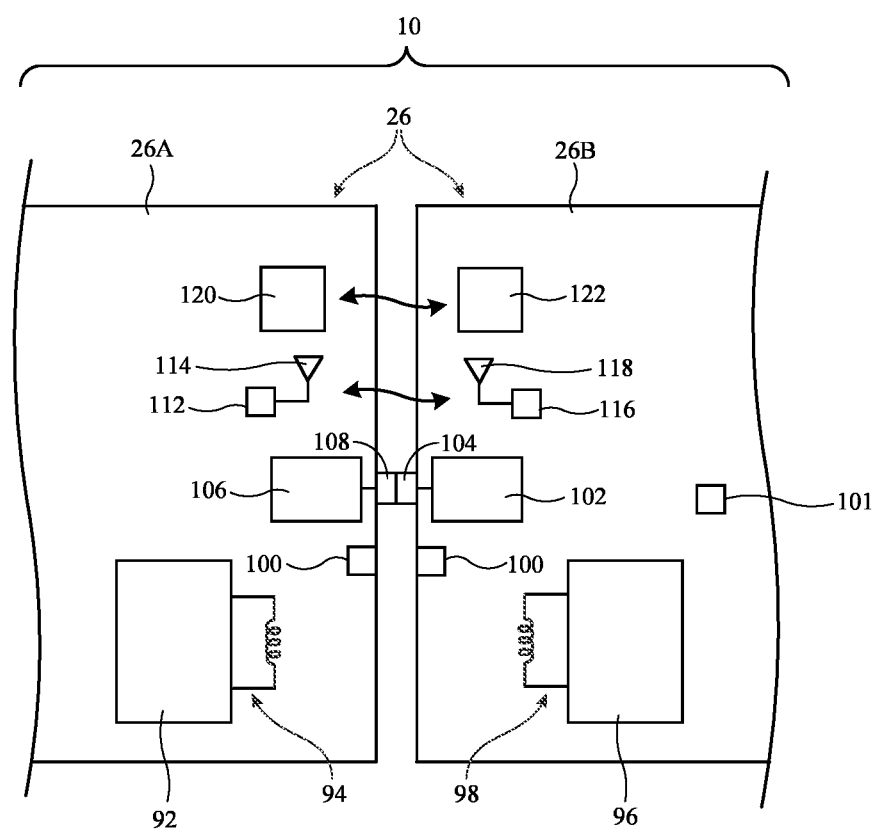
FIG. 4 is a cross-sectional side view of a removable accessory such as a removable support structure or other removable structure that is coupled to a portion of a head-mounted device housing in accordance with an embodiment.

FIG. 4 is a diagram of illustrative communications circuitry and power transfer circuitry that may be used in device 10. As shown in FIG. 4, alignment and coupling structures may be provided in device 10 such as mating magnets 100 in a removable accessory such as strap 26B and housing 26A. Magnets 100 and/or latches or other coupling structures (see, e.g., the attachment mechanism of FIG. 3) may be used in removably attaching strap 26B or other removable accessory to housing 26A.

In general, any suitable removable accessories may be removably coupled to housing 26A. In an illustrative configuration, which is sometimes described herein as an example, the removable portion of device 10 is a removable strap (strap 26B). Other accessories that contain some or all of the circuitry of strap 26B may be removable attached to housing 26A, if desired. As an example, a removable face cushion (sometimes referred to as a removable ring-shaped housing member, removable light seal, or removable rear housing member) may be removably coupled to the inwardly facing (user-facing) side of housing 26A (e.g., using magnets, alignment posts and mating alignment openings, snaps, latches, etc.). The removable light seal that is to be coupled to housing 26A may be selected by a user based on personal preference (e.g., to customize the size of the light seal to the size of the user's head). Another removable accessory that may be used is a removable lens (e.g., a vision correction lens that is customized to a user's vision). Other removable accessories may likewise be chosen based on user preferences (e.g., to adjust the size and/or shape of the removable accessory, to change the appearance of the accessory to satisfy a user's preferences, to provide fewer or more features than alternative removable accessories, to provide fresh battery power in configurations in which the removable accessory contains a battery, etc.). Removable accessories may have sensors for gathering data, input-output devices such as speakers, buttons, etc., batteries, etc. The housing walls of a removable accessory may be hermetically sealed to prevent moisture ingress. Although the use of a removable accessory for device 10 that serves as a headband or part of a headband (e.g., strap 26B) is sometimes described as an example, any removable accessory that contains some or all of the components of strap 26B (e.g., sensors and/or other input-output devices, a battery, etc.) may, if desired, be removably coupled to housing 26A as shown in FIGS. 3 and 4.

As shown in FIG. 4, when strap 26B is coupled to housing 26A, the circuitry of strap 26B and the circuitry of housing 26A may communicate and transfer power between each other (from strap to housing and/or from housing to strap).

Consider, as an example, the use of wired connections. Strap 26B may have one or more connectors such as connector 104 that mate with corresponding connectors in housing 26A such as connector 108. Communications and power circuitry 102 may be provided in strap 26B and may be coupled via a wired connection (e.g., connectors 104 and 108) to corresponding communications and power circuitry 106 in housing 26A. Strap 26B may have a power source such as battery 101. During operation, battery 101 or other power source may be used to supply power. Circuitry 102 may supply the power to components in strap 26B and may transfer the power to circuitry 106 to use in powering circuitry in housing 26A. In some embodiments power may be provided to strap 26B from housing 26A using circuitry 106 and 102. Data may likewise be transmitted from circuitry 102 to circuitry 106 using the wired communications path formed by mating connectors 104 and 108 and, if desired, may be transmitted from circuitry 106 to circuitry 102.

Another way in which to transfer power and data involves wireless signals. Consider, as an example, the transfer of wireless power. Strap 26B may have wireless power transmitter circuitry that is configured to transmit power wirelessly to corresponding wireless power receiving circuitry in housing 26A and vice versa. Bidirectional wireless power transfer arrangements and unidirectional wireless power transfer arrangements may be used. Wireless power transmission may involve capacitive coupling of wireless power transfer electrodes in strap 26B and housing 26A or may involve other wireless transfer schemes such as inductive coupling schemes. As an example, strap 26B may have a wireless power transmitter that includes an inverter or other wireless power transmitting circuit 96 that is coupled to a wireless power transfer coil such as coil 98. Coil 98 may be electromagnetically coupled (e.g., near-field inductively coupled) to wireless power transfer coil 94 in housing 26A. Housing 26A may have a wireless power receiver that includes a rectifier or other wireless power receiving circuit 92 that is coupled to coil 94. During operation, the inverter in circuit 96 may drive coil 98 with alternating-current (AC) signals (e.g., signals at a frequency of at least 50 kHz, at least 100 kHz, at least 1 MHz, less than 5 MHz, less than 2 MHz, less than 500 kHz, or other suitable inductive wireless power frequency), causing wireless power signals to be conveyed from coil 98 to coil 94 (e.g., coil 98 may serve as a wireless power transmitting coil and coil 94 may serve as a wireless power receiving coil). Rectifier circuitry in circuit 92 may covert these AC signals to direct-current (DC) power for circuitry in housing 26A. If desired, inductive wireless power transfer may also be used to transfer power wirelessly from housing 26A to strap 26B (e.g., circuit 92 may have an inverter, coil 94 may serve as a power transmitting coil, coil 98 may serve as a power receiving coil, and circuit 96 may have a rectifier).

Data may also be conveyed wirelessly. For example, strap 26B may include radio-frequency transceiver circuitry 116 and antenna 118. Housing 26A may include corresponding radio-frequency transceiver circuitry 112 and antenna 114. Antennas 118 and 114 may be patch antennas, dipoles, monopoles, loop antennas, inverted-F antennas, and/or other suitable antennas. In some configurations (e.g., when capacitively-conductive patches are used in forming antennas 118 and 114 and/or when near-field coil antennas are used in forming antennas 118 and 114), antennas 118 and 114 may be capacitively near-field coupled or inductively near-field coupled. Shielding may surround the rear portions of antennas 118 and 114 to help confine radio-frequency signals.

Circuitry 116 may contain a transmitter and/or a receiver and circuitry 112 may contain a receiver for receiving signals from antenna 114 that were transmitted by the transmitter of circuitry 116 and antenna 118 and/or may contain a transmitter that uses antenna 114 to transmit signals that are received by the receiver of circuitry 116 using antenna 118. Circuitry 116, antenna 118, antenna 114, and circuitry 112 may be configured to operate at any suitable wireless communications frequency (e.g., at least 1 MHz, at least 10 MHz, at least 100 MH, at least 1 GHZ, at least 6 HZ, frequencies of 1-300 GHz, 20-100 GHz, frequencies of 30-300 GHz, which are sometimes referred to as millimeter wave frequencies or extremely high frequency band frequencies, 40-100 GHz, less than 300 GHz, less than 150 GHz, less than 10 GHz, or other suitable frequency or frequencies. In an illustrative arrangement, circuitry 116, antenna 118, antenna 114, and circuitry 112 are configured to operate at a frequency of 60 GHz or other suitable frequency from 30 GHz to 300 GHz, which is suitable for short-range communications with a potentially high data rate. Other radio-frequency communications bands may be used in wirelessly transmitting data from strap 26B to housing 26A and/or in wirelessly transmitting data from housing 26A to strap 26B, if desired.

Optical communications may also be used in transmitting data wirelessly. As shown in FIG. 4, strap 26B may contain optical transceiver 122 and housing 26A may contain optical transceiver 120. Transceiver 122 may contain a transmitter circuit for transmitting data using an associated light emitter such as a laser or light-emitting diode. Transceiver 120 may contain a receiver circuit for receiving the transmitted data using an associated light detector (e.g., a photodetector such as a photodiode). Transceiver 120 may also contain a light-emitting device such as a laser or light-emitting diode that is driven by a data transmitter and transceiver 122 may have a corresponding photodetector or other light detector that is used in conjunction with a data receiver circuit in transceiver 122 to receive transmitted data. In this type of arrangement, data signals may be conveyed using light (e.g., transmitted light from strap 26B that is received at housing 26A and/or transmitted light from housing 26A that is received at strap 26B). The light that is used in performing optical communications between strap 26B and housing 26A may be infrared light, ultraviolet light, and/or visible light.

To help protect the communications and power circuitry of device 10 from moisture and other environmental contaminants, wireless data circuitry (optical and/or radio-frequency circuitry) and/or wireless power circuitry may be sealed within the interior of housing 26A and within the interior of strap 26B (or other removable accessory such as a removable light seal, a removable lens, or other removable accessory). Light associated with optical communications may pass through housing walls. For example, some or all of the walls forming strap 26B and housing 26A may be formed from an infrared-transparent-and-visible-light-blocking polymer or other visibly opaque material that allows infrared light signals for communications to pass while shielding internal components from view by a user. Windows formed from clear materials (e.g., optical communications windows that are transparent at visible wavelengths, infrared wavelengths, etc.) may also be provided in device 10, if desired. For example, a first optical communications window may be formed on strap 26B and a second optical communications window may be formed on housing 26A. When strap 26B is coupled to housing 26A, the optical emitter of strap 26B is preferably aligned with and overlaps the optical detector of housing 26A and the optical emitter of housing 26A is preferably aligned with and overlaps the optical detector of strap 26B. Antennas 114 and 118, optional wired connectors 108 and 104, and wireless power coils 94 and 98 are also preferably configured to align with each other and overlap each other. Antennas 114 and 118 and wireless power coils 94 and 98 may, if desired, be hidden under opaque dielectric structures (e.g., walls formed from radio-transparent visibly opaque polymer, etc.).

Although sometimes described in connection with the use of a removable accessory such as a strap, any suitable removable accessory may be provided with any or all of the features of strap 26B of FIG. 4 (e.g., sensors, batteries, wireless communications circuitry, wireless power circuitry, etc.) and this accessory may gather sensor data and may exchange power and/or data with housing 26A (e.g., 26B of FIG. 4 may be a removable accessory such as removable light seal formed from a cushioned removable light seal member, a removable vision correction lens, or other removable structure that is provided with sensors, input-output devices, batteries, and/or other components such as some or all of the circuitry of the strap described in connection with FIG. 4). Descriptions of device 10 that involve the use of a strap instead of a light seal, removable lens, or other removable accessory are provided as examples.

Figure 5:
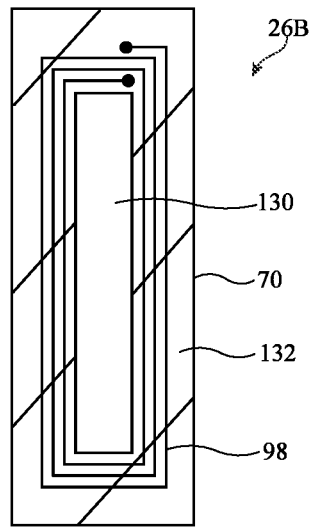
FIG. 5 is an end view of an illustrative head-mounted device housing with an opening to receive part of a head-mounted device strap in accordance with an embodiment.

Viewed along the longitudinal axes of the left and right sides of strap 26B, the left and right sides of strap 26B and mating portions of housing 26A may have cross-sectional shapes that are circular, oval, rectangular with square or rounded corners, and/or other suitable cross-sectional shapes. An end view of one of the sides of strap 26B is shown in FIG. 5. As shown in FIG. 5, portion 70 of strap 26B may include a central male plug portion such as plug 130 that protrudes (out of the page in the configuration of FIG. 5) relative to surrounding portions 132. Inductive power coil 98 may be formed from a conductive line (e.g., wire, metal traces on a printed circuit, etc.) that has one or more turns running around the periphery of plug 130 (as an example).

Figure 6:
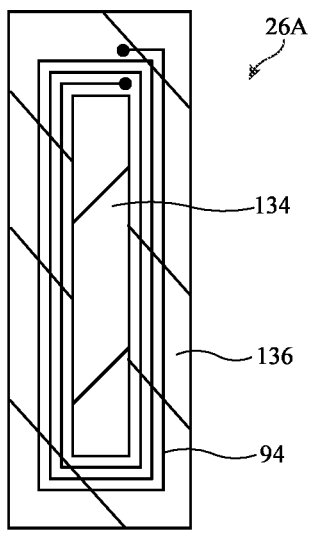
FIG. 6 is an end view of an illustrative head-mounted device strap in accordance with an embodiment.

As shown in FIG. 6, housing 26A may have a mating shape. Housing 26A may, as an example, have a recess such as socket 134 that is recessed relative to surrounding portions 136 of housing 26A. Inductive power coil 94 may be formed from a conductive line (e.g., wire, metal traces on a printed circuit, etc.) that has one or more turns surrounding the periphery of socket 134. When strap 26B is attached to housing 26A, coils 98 and 94 are axially aligned (their coil axes are aligned) so that magnetic fields produced by one of the coils may be efficiently received by the other.

Figure 7:
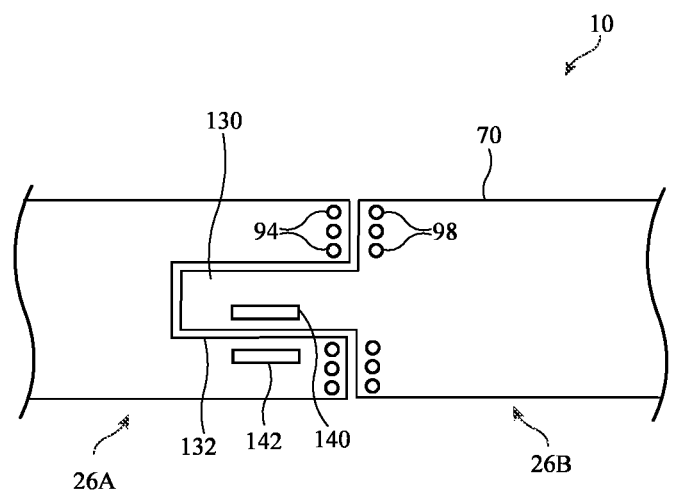
FIG. 7 is a cross-sectional side view of an illustrative strap and head-mounted device housing in accordance with an embodiment.

FIG. 7 is a cross-sectional side view of device 10 showing how portion 70 of strap 26B may be attached to housing 26A. Magnets 100 (FIG. 4), a latch mechanism (see, e.g., FIG. 3), a press-fit connection, and/or other attachment structures may be used to removably attach strap 26B to housing 26A. When attached as shown in FIG. 7, one or more protruding portions of strap 26B such as plug 130 may be received in one or more recessed portions of housing 26A such as socket 132 and/or other engagement structures associated with strap 26B may engage with corresponding engagement structures associated with housing 26A.

When strap 26B is coupled to housing 26A, wireless power transfer coils 98 and 94 may be aligned with each other (e.g., these coils may overlap while being axially aligned and placed adjacent to each other for efficient magnetic coupling). Transceiver circuitry 140 in strap 26B may also be adjacent to and/or otherwise overlapping and aligned with corresponding transceiver circuitry 142 of housing 26A. Circuitry 140 may include optical transceiver circuitry 122, radio-frequency wireless communications circuitry such as circuit 116 and antenna 118, and/or wired communications circuitry such as circuitry 102 and connector 104. Circuitry 142 may include optical transceiver circuitry 120, radio-frequency wireless communications circuitry such as circuit 112 and antenna 114, and/or wired communications circuitry such as circuitry 106 and connector 108. In an illustrative configuration, transceiver 140 and transceiver 142 communicate using infrared light or other light that is transmitted and received through the walls of plug 130 and socket 132 and/or transceiver 140 and transceiver 142 communicate wirelessly using radio-frequency signals that are transmitted and received through the walls of plug 130 and socket 132.

Although sometimes described herein in the context of a removable strap that plugs into housing 26A, device 10 may have other removable structures, if desired. For example, housing 26A may be removably attached to a tabletop stand, may be removably attached to a hat or helmet, may be removably attached to a docking station, etc. The data that is exchanged between the removable portion of device 10 and housing 26A may be used to identify the owner of the removable portion (e.g., to specify the identity of the user associated with a particular strap 26B), may be used for authentication (e.g., to ensure that strap 26B or other removable portion of device 10 is authorized to interoperate with housing 26A), may be used to provide sensor data (e.g., front-facing, side-facing, and rear-facing image data, three-dimensional image sensor data from sensors facing to the front, side, and/or rear such as three-dimensional images from a structured light sensor or three-dimensional time-of-flight sensor, etc.), may be used to provide ultrasonic sensor data, may be used to provide radio-frequency sensor data (e.g., radar images and/or other radar data), and/or other sensor data, and/or may be used to convey content (e.g., media content such as audio, video, etc.) from strap 26B or other removable support structure to housing 26A (as examples). In some configurations, the components of strap 26B or other removable support structure may gather user input (e.g., strap 26B may have a touch sensor, button, force sensor, accelerometer, microphone, or other input device that gathers user input). In this type of arrangement, data communications between strap 26B and housing 26A may be used to convey user input from strap 26B to housing 26A. Housing 26A may supply data (e.g., control signals and/or media) to output components in strap 26B such as haptic output devices, speakers (e.g., ear speakers aligned with a user's ears), light-emitting components, and/or other output devices. The use of data communications between housing 26A and strap 26B can therefore be used to help provide strap-based output to a user.

Strap 26B may have a battery that supplies all of the power for device 10 or may have a battery that serves to supplement a battery in housing 26A. Power may be transferred between strap 26B and the circuitry of housing 26A to power circuitry in housing 26A and/or power from an optional battery in housing 26A may be transferred to strap 26B (e.g., to replenish a battery in strap 26B or to operate components in strap 26B). In configurations in which housing 26A has no battery, strap 26B may contain the only battery in device 10 and may use wired and/or wireless power transfer techniques to convey power from the batter to circuitry in housing 26A during normal operation.

In accordance with an embodiment, a head-mounted device is provided that includes a head-mounted housing; left and right displays in the head-mounted housing that are configured to provide respective left and right images viewable from left and right eye boxes; and a removable head strap that is removably coupled to the head-mounted housing; wireless power transmitting circuitry in the removable head strap that is configured to transmit wireless power signals; and wireless power receiving circuitry in the head-mounted housing that is configured to receive the transmitted wireless power signals.

In accordance with another embodiment, the head-mounted device includes first wireless communications circuitry in the removable head strap and second wireless communications circuitry in the head-mounted housing, the first wireless communications circuitry is configured to wirelessly communicate with the second wireless communications circuitry at a frequency of 30 GHz to 300 GHz.

In accordance with another embodiment, the head-mounted device includes first optical communications circuitry in the removable head strap and second optical communications circuitry in the head-mounted housing, the first optical communications circuitry is configured to transmit data to the second optical communications circuitry using light.

In accordance with another embodiment, the first optical communications circuitry includes an infrared light-emitting device configured to emit the light.

In accordance with another embodiment, the first optical communications circuitry includes a photodetector configured to receive signals from the second optical communications circuitry.

In accordance with another embodiment, the wireless power transmitting circuitry includes a wireless power transmitting coil and the wireless power receiving circuitry includes a wireless power receiving coil.

In accordance with another embodiment, the wireless power receiving coil and wireless power transmitting coil are configured to overlap when the removable head strap is attached to the head-mounted support structure.

In accordance with another embodiment, the removable head strap has a head strap portion configured to mate with a mating head-mounted support structure portion of the head-mounted support structure when the removable head strap is coupled to the head-mounted support structure.

In accordance with another embodiment, the head strap portion includes a plug and the head-mounted support structure portion is configured to receive the plug.

In accordance with another embodiment, the head-mounted support structure portion includes a socket, the wireless power transmitting circuitry includes a first coil that surrounds the plug, and the wireless power receiving circuitry includes a second coil that surrounds the socket.

In accordance with another embodiment, the head-mounted device includes first wireless communications circuitry on the plug and second wireless communications circuitry in the head-mounted support structure portion adjacent to the socket.

In accordance with another embodiment, the first wireless communications circuitry includes a first antenna configured to transmit wireless signals and the second wireless communications circuitry includes a second antenna that is configured to receive the transmitted wireless signals and that overlaps the first antenna when the plug is in the socket.

In accordance with another embodiment, the first antenna is configured to transmit the wireless signals at a frequency of 30-300 GHz.

In accordance with another embodiment, the first wireless communications circuitry includes a light-emitting device configured to transmit light signals and the second wireless communications circuitry includes a light detecting device that is configured to receive the transmitted light signals when the plug is in the socket.

In accordance with another embodiment, the transmitted light signals include infrared light and the socket and plug have visibly opaque structures through which the infrared light is transmitted.

In accordance with another embodiment, the head-mounted device includes a latching mechanism that is configured to attach and release the head strap from the head-mounted support structure.

In accordance with an embodiment, a head-mounted device operable with a removable head strap that has a wireless communications transmitter configured to transmit wireless data, the head-mounted device is provided that includes a head-mounted housing; left and right displays in the head-mounted housing that are configured to provide respective left and right images viewable from left and right eye boxes; and a wireless communications receiver configured to receive the transmitted wireless data.

In accordance with another embodiment, the head-mounted device includes a wireless power receiver configured to receive wireless power from a wireless power transmitter in the removable head strap.

In accordance with another embodiment, the wireless communications receiver includes an optical receiver.

In accordance with another embodiment, the wireless communications receiver includes a radio-frequency receiver operable at a frequency of 30 to 300 GHz.

In accordance with an embodiment, a head strap configured to removably couple to a head-mounted device housing that has a wireless power receiving coil, the head strap is provided that includes a battery; a wireless power transmitting circuit configured to wirelessly transmit power to the wireless power receiving coil; and wireless communications circuitry configured to transmit data to the head-mounted device housing.

In accordance with another embodiment, the head strap includes a protruding portion configured to attach to a mating portion of the head-mounted device housing, the wireless power transmitting circuit includes a wireless power transmitting coil configured to align with the wireless power receiving coil when the protruding portion is attached to the mating portion.

In accordance with another embodiment, the wireless communications circuitry includes an antenna configured to operate at 30 GHz to 300 GHz.

In accordance with another embodiment, the head strap includes an image sensor configured to capture image data, the wireless communications circuitry is configured to transmit the image data to the head-mounted device housing.

In accordance with an embodiment, an accessory configured to removably couple to a head-mounted device housing that has a wireless power receiving coil, the accessory is provided that includes a battery; a wireless power transmitting circuit configured to wirelessly transmit power to the wireless power receiving coil; and wireless communications circuitry.

In accordance with another embodiment, the wireless communications circuitry is configured to transmit data to the head-mounted device housing.

In accordance with another embodiment, the accessory includes a sensor configured to capture sensor data.

In accordance with another embodiment, the wireless communications circuitry is configured to transmit the sensor data to the head-mounted device housing.

In accordance with another embodiment, the accessory includes a cushioned removable light seal member configured to removably couple to the head-mounted device housing.

In accordance with another embodiment, the accessory includes a vision correction lens that is configured to removably couple to the head-mounted device housing.

The foregoing is merely illustrative and various modifications can be made to the described embodiments. The foregoing embodiments may be implemented individually or in any combination.

What is claimed is:

1. A head-mounted device, comprising:
   a head-mounted support structure;
   left and right displays in the head-mounted support structure that are configured to provide respective left and right images viewable from left and right eye boxes; and
   a removable head strap that is removably coupled to the head-mounted support structure;
   wireless power transmitting circuitry in the removable head strap that is configured to transmit wireless power signals; and
   wireless power receiving circuitry in the head-mounted support structure that is configured to receive the transmitted wireless power signals.

2. The head-mounted device defined in claim 1 further comprising first wireless communications circuitry in the removable head strap and second wireless communications circuitry in the head-mounted support structure, wherein the first wireless communications circuitry is configured to wirelessly communicate with the second wireless communications circuitry at a frequency of 30 GHz to 300 GHz.

3. The head-mounted device defined in claim 1 further comprising first optical communications circuitry in the removable head strap and second optical communications circuitry in the head-mounted support structure, wherein the first optical communications circuitry is configured to transmit data to the second optical communications circuitry using light.

4. The head-mounted device defined in claim 3 wherein the first optical communications circuitry comprises an infrared light-emitting device configured to emit the light.

5. The head-mounted device defined in claim 3 wherein the first optical communications circuitry comprises a photodetector configured to receive signals from the second optical communications circuitry.

6. The head-mounted device defined in claim 1 wherein the wireless power transmitting circuitry comprises a wireless power transmitting coil and wherein the wireless power receiving circuitry comprises a wireless power receiving coil.

7. The head-mounted device defined in claim 6 wherein the wireless power receiving coil and the wireless power transmitting coil are configured to overlap when the removable head strap is attached to the head-mounted support structure.

8. The head-mounted device defined in claim 1 wherein the removable head strap has a head strap portion configured to mate with a mating head-mounted support structure portion of the head-mounted support structure when the removable head strap is coupled to the head-mounted support structure.

9. The head-mounted device defined in claim 8 wherein the head strap portion comprises a plug and wherein the head-mounted support structure portion is configured to receive the plug.

10. The head-mounted device defined in claim 9 wherein the head-mounted support structure portion comprises a socket, wherein the wireless power transmitting circuitry comprises a first coil that surrounds the plug, and wherein the wireless power receiving circuitry comprises a second coil that surrounds the socket.

11. The head-mounted device defined in claim 10 further comprising first wireless communications circuitry on the plug and second wireless communications circuitry in the head-mounted support structure portion adjacent to the socket.

12. The head-mounted device defined in claim 11 wherein the first wireless communications circuitry comprises a first antenna configured to transmit wireless signals and wherein the second wireless communications circuitry comprises a second antenna that is configured to receive the transmitted wireless signals and that overlaps the first antenna when the plug is in the socket.

13. The head-mounted device defined in claim 12 wherein the first antenna is configured to transmit the wireless signals at a frequency of 30-300 GHz.

14. The head-mounted device defined in claim 11 wherein the first wireless communications circuitry comprises a light-emitting device configured to transmit light signals and wherein the second wireless communications circuitry comprises a light detecting device that is configured to receive the transmitted light signals when the plug is in the socket.

15. The head-mounted device defined in claim 14 wherein the transmitted light signals comprise infrared light and wherein the socket and plug have visibly opaque structures through which the infrared light is transmitted.

16. The head-mounted device defined in claim 11 further comprising a latching mechanism that is configured to attach and release the removable head strap from the head-mounted support structure.

17. A head-mounted device operable with a removable head strap that has a wireless communications transmitter configured to transmit wireless data, the head-mounted device, comprising:
   a head-mounted housing;
   left and right displays in the head-mounted housing that are configured to provide respective left and right images viewable from left and right eye boxes; and
   a wireless communications receiver configured to receive the transmitted wireless data.

18. The head-mounted device defined in claim 17 further comprising a wireless power receiver configured to receive wireless power from a wireless power transmitter in the removable head strap.

19. The head-mounted device defined in claim 18 wherein the wireless communications receiver comprises an optical receiver.

20. The head-mounted device defined in claim 18 wherein the wireless communications receiver comprises a radio-frequency receiver operable at a frequency of 30 to 300 GHz.

21. A head strap configured to removably couple to a head-mounted device housing that has a wireless power receiving coil, the head strap comprising:
   a battery;
   a wireless power transmitting circuit configured to wirelessly transmit power to the wireless power receiving coil; and
   wireless communications circuitry configured to transmit data to the head-mounted device housing.

22. The head strap defined in claim 21 wherein the head strap comprises a protruding portion configured to attach to a mating portion of the head-mounted device housing, wherein the wireless power transmitting circuit comprises a wireless power transmitting coil configured to align with the wireless power receiving coil when the protruding portion is attached to the mating portion.

23. The head strap defined in claim 22 wherein the wireless communications circuitry comprises an antenna configured to operate at 30 GHz to 300 GHz.

24. The head strap defined in claim 21 further comprising an image sensor configured to capture image data, wherein the wireless communications circuitry is configured to transmit the image data to the head-mounted device housing.

25. An accessory configured to removably couple to a head-mounted device housing that has a wireless power receiving coil, the accessory comprising:
   a battery;
   a wireless power transmitting circuit configured to wirelessly transmit power to the wireless power receiving coil; and
   wireless communications circuitry.

26. The accessory defined in claim 25 wherein the wireless communications circuitry is configured to transmit data to the head-mounted device housing.

27. The accessory defined in claim 26 further comprising a sensor configured to capture sensor data.

28. The accessory defined in claim 27 wherein the wireless communications circuitry is configured to transmit the sensor data to the head-mounted device housing.

29. The accessory defined in claim 25 further comprising a cushioned removable light seal member configured to removably couple to the head-mounted device housing.

30. The accessory defined in claim 25 further comprising a vision correction lens that is configured to removably couple to the head-mounted device housing.

* * * * *